April 15, 1952  O. W. SWANSON  2,592,833
APPARATUS FOR STRIPPING LEAVES FROM FLOWERS
Filed Jan. 20, 1947  2 SHEETS—SHEET 1
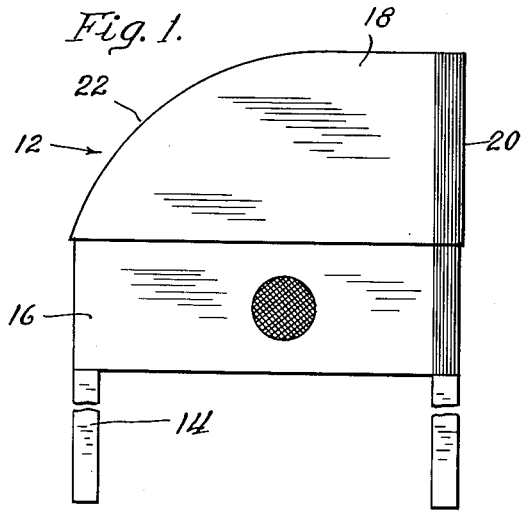
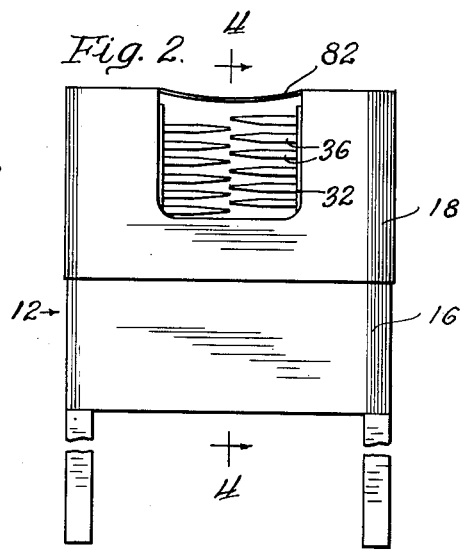
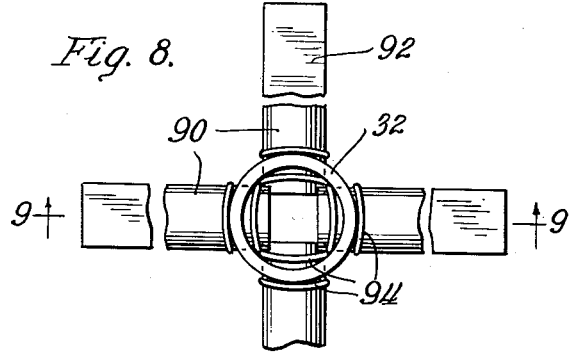
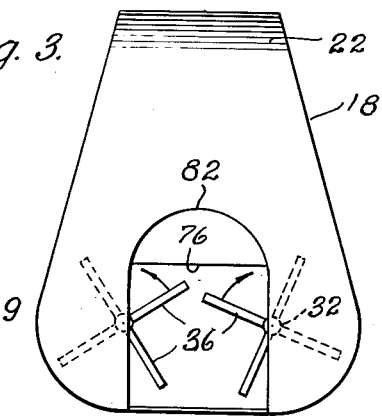
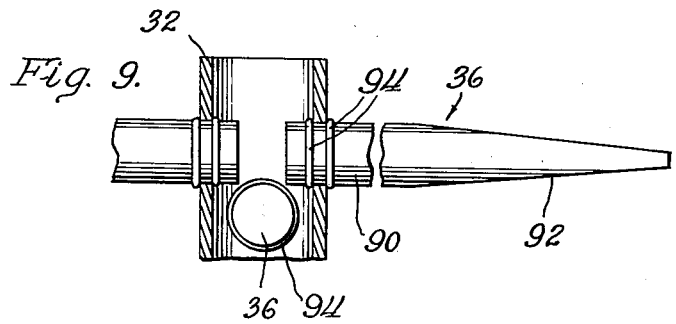
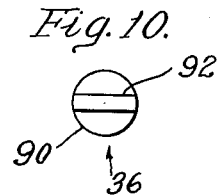
INVENTOR.
Oscar W. Swanson
BY
Bair & Freeman
Attys.

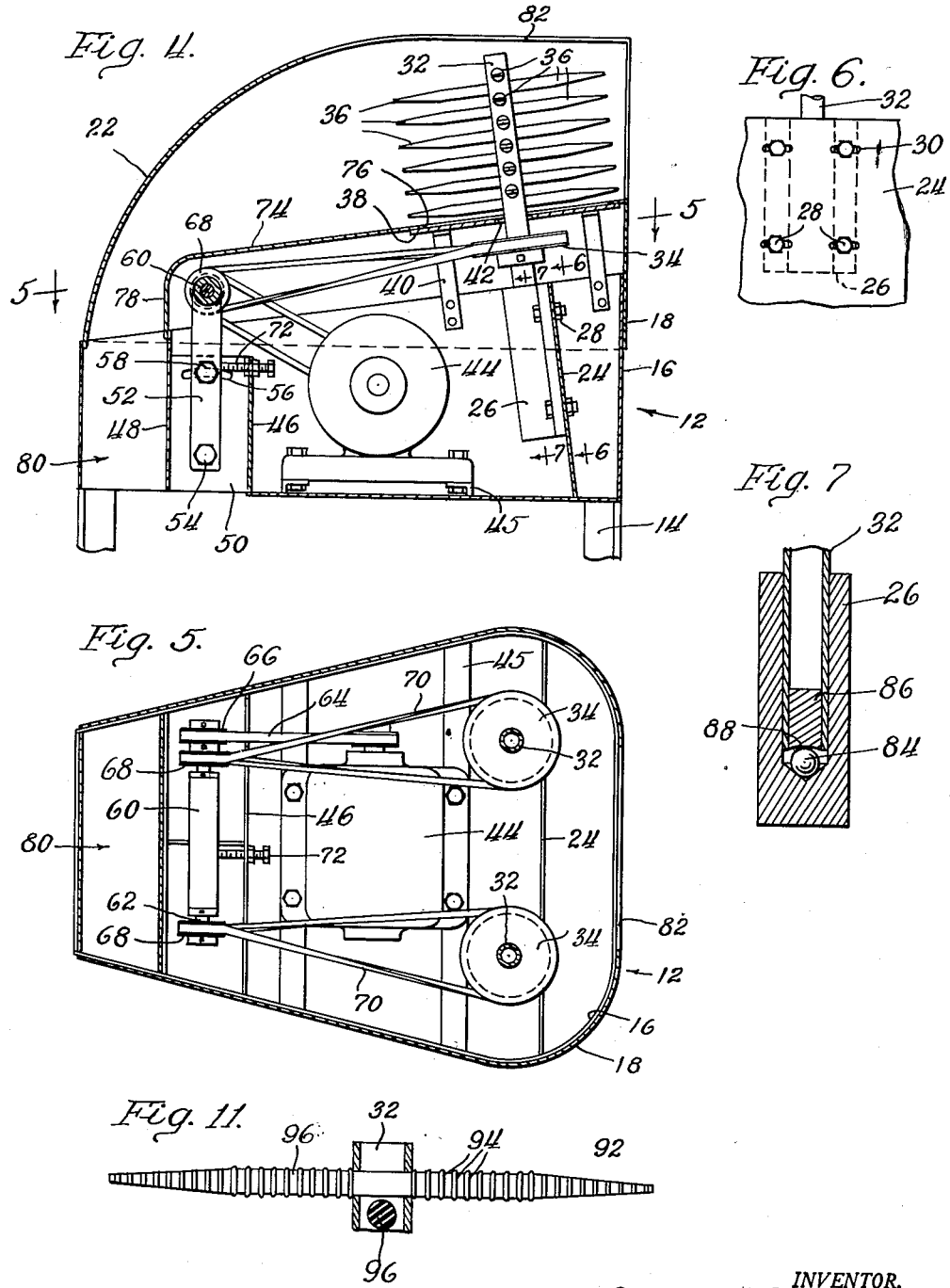

Patented Apr. 15, 1952

2,592,833

UNITED STATES PATENT OFFICE 2,592,833

APPARATUS FOR STRIPPING LEAVES FROM FLOWERS

Oscar W. Swanson, Ottumwa, Iowa, assignor to Barker Poultry Equipment Company, Ottumwa, Iowa, a corporation of Iowa Application January 20, 1947, Serial No. 723,036

11 Claims. (Cl. 47—1)

The present invention relates to a device for stripping leaves and thorns from the stems of flowers.

Florists find it highly desirable to strip the leaves and thorns from the stems of cut flowers. Leaves which remain on the stems tend to sour the water in which the flowers are placed, shortening their life, and it is of course desirable to have the thorns removed for more comfortable handling.

Such operations were usually done by hand previously and until the present invention.

It is therefore an object of the present invention to provide a simple, compact and convenient device for use by a florist, by means of which such stripping operation may be performed quickly on flowers in a bunch.

Stripping of leaves and thorns from the stems of flowers is accomplished by the present invention by the rapid and repeated sweeping of fingers through the stems of flowers in a bunch.

Such fingers are arranged in spaced relation transverse to the length of the stems of the flowers, and are impelled through the stems in a direction along the length of the stems.

The spaced-apart feature of the stripping fingers is such that adjacent fingers coact with one another in stripping all sides of the stems.

The stripping fingers are semi-flexible, that is, they yield to some extent, but possess sufficient rigidity to retain their normal shape when not subjected to stress.

The stripping fingers are tapered so that they will enter between the stems of the flowers more readily, and the main body of the fingers possess sufficient size and strength to effectively strip the leaves and thorns from the stems.

The device includes a cabinet in which are two counter-rotating shafts spaced radially apart and from which the stripping fingers project radially outwardly. The cabinet is provided with an opening adjacent and between said rotating shafts into which the bunches of flowers may be inserted for stripping by the stripping fingers.

Successive stripping fingers on each of the shafts are offset angularly around the shaft in order to provide greater efficiency in stripping all of the stems of the bunch of flowers.

The shafts with the stripping fingers thereon rotate at a considerable speed. The fingers thus create a physical force by which the leaves and thorns are thrown after being stripped from the stems, and in addition the rotating fingers create an air stream. The physical force of the fingers contacting the leaves and thorns together with the air stream, carry the leaves and thorns away from the point from which they are stripped.

The cabinet is constructed and arranged to channel and direct the leaves and thorns after they are stripped from the stems to a point of deposit.

With these and other objects in view, my invention consists in the construction, arrangement and combination of the various parts of my device whereby the objects contemplated are attained as hereinafter more fully set forth, pointed out in my claims and illustrated in the accompanying drawing, wherein:

Figure 1 is a side view of the device;

Figure 2 is a front view;

Figure 3 is a top view;

Figure 4 is an enlarged vertical sectional view taken on line 4—4 of Figure 2;

Figure 5 is a sectional view taken on line 5—5 of Figure 4;

Figure 6 is a fragmentary view taken on line 6—6 of Figure 4;

Figure 7 is an enlarged sectional view taken on line 7—7 of Figure 4;

Figure 8 is a top view of one of the rotating shafts containing the stripping fingers;

Figure 9 is a vertical sectional view of one of the shafts with the stripping fingers taken approximately on line 9—9 of Figure 8;

Figure 10 is an end view of one of the stripping fingers as viewed from the right of Figure 9; and Figure 11 is a fragmentary vertical sectional view of one of the rotating shafts showing a modified form of stripping finger.

Referring in detail to the drawings, the device contains a cabinet indicated generally at 12 having supporting legs 14 of any convenient height. The cabinet 12 contains a lower section 16 for supporting the operating parts of the device, and an upper section 18 removably fitted on and forming a cover for the lower section.

The forward end of the cabinet 12 may be identified by the reference numeral 20 and the rear end of the upper section 18 of the cabinet is rounded downwardly as shown at 22.

The lower section 16, as may be observed from Figure 4, is in the form of a receptacle having its open side facing upwardly and its upper margin sloping downwardly rearwardly. Disposed transversely across the lower section 16, toward the forward end thereof and secured to the sides thereof, is a partition or plate 24 having its upper end inclined rearwardly. Secured to the rear side of the plate 24 are a pair of bearing sockets 26 disposed vertically and spaced apart transversely of the plate 24. The bearing sockets 26 are secured to the plate 24 by means of bolts 28 passing through horizontally elongated slots 30 in the plate 24. The bearing sockets 26 terminate adjacent the upper marginal edge of the section 16 and rotatably supported in each socket 26 is a shaft 32. Secured to each shaft 32 above the bearing sockets is a drive pulley 34. The upper end of the shafts 32 are provided with a plurality of stripping fingers 36 which extend radially outwardly therefrom in angularly spaced relation. The specific construction and purpose of such stripping fingers 36 will be referred to later.

Disposed immediately below the stripping fingers 36 is a plate 38 secured to the side walls of the lower section 16 of the cabinet by means of brackets 40. The plate 38 is provided with an opening 42 for each of the shafts 33. The plate 38 extends transversely across the cabinet and its width is approximately the length of the stripping fingers 32.

It will be noted that the shafts 32 are inclined rearwardly in line with the inclined disposition of the plate 24.

A drive motor 44 is disposed in the lower section 16 rearwardly of the plate 24 and supported such as by angle members 45 extending across the cabinet.

Rearwardly of the drive motor 44 are two additional vertical transverse plates 46 and 48 spaced apart longitudinally of the machine. Secured between the plates 46 and 48 is a supporting web 50 upon which is mounted an adjustable bracket 52 pivoted at 54 in the lower portion of the web 50. Toward the upper portion of the web 50 is an arcuate slot 56 having its center of curvature at the pivot point 54. A bolt 58 is fitted in the bracket 52 and the slot 56. The bracket 52 extends upwardly beyond the web 50 and has formed on its upper end a transverse bearing sleeve 60 in which a shaft 62 is rotatably mounted. A drive belt 64 interconnects the drive motor 44 and pulley 66 on the shaft 62. Additional pulleys 68 are secured to the shaft 62 and from the pulleys 68 drive belts 70 lead to pulleys 34 on the shafts 32.

An adjusting bolt 72 is threaded through an opening in the transverse plate 46 and engages the forward side of the bracket 52. The adjusting bolt 72 may be provided with a locknut. Threading the adjusting bolt 72 rearwardly through the plate 46 swings the bracket 52 rearwardly and acts as a belt tightener for the belts 64 and 70.

It will of course be understood that a motor having drive pulleys on opposite ends of its shaft may as well be used, with drive belts therefrom to the pulleys 34 on the shafts 32.

The upper section 18 of the cabinet is provided with a horizontal plate 74 secured to the side walls thereof. The plate 74 is provided with an opening 76 toward the forward end thereof and slopes downwardly rearwardly, covering the operating parts disposed in the lower section 16, and extending substantially the length of the cabinet. The rear end of the plate 74 turns downwardly at 78, the lower end of which extends into vertical passage 80 formed between the transverse plate 48 and the rear wall of the lower section 16. The lower extremity of the rounded portion 22 of the upper section 18 also fits inside the vertical passage 80. It will be noted that the vertical passage 80 is formed with an open bottom for a purpose which will be referred to later.

In fitting the upper section 18 on the lower section 16, the opening 76 in the plate 74 is passed over the stripping fingers 36 and the plate 74 resting on the plate 38 supports the forward end of the upper section 18 of the cabinet. The rear end is supported by the lower extremity of the rounded portion 22 resting on the upper edge of the rear wall of the lower section.

The upper section 18 of the cabinet is provided with an opening 82 which is formed in the front wall and top of the cabinet (Figures 2 and 3). The opening 82 extends from adjacent the plate 74 in the front wall upwardly and across the top longitudinally of the machine to a point rearward of the rear extremity of the stripping fingers 36.

The shafts 32 are adjustable toward and from each other by means of elongated slots 30 in the plate 24 (Figure 6), and may be secured in adjusted position by the bolts 28.

Figure 7 shows the details of construction of the bearing sockets 26 and the shafts 32. The bearing sockets 26 are provided with drilled cavities in which ball bearings 84 are inserted. The shafts 32 are in the form of tubing and the lower ends thereof are provided with press fitted plugs 86 having concave lower surfaces 88 which bear on the ball bearings 84. The weight of the shafts retain them in the bearing sockets.

Figures 8, 9 and 10 show the details of one form of stripping finger. The preferred form of stripping finger is made of rubber, or other preferred material, to furnish a degree of flexibility. Each finger 36 has a main body portion 90 which is generally elongated and may be circular if desired. The outer portion of each finger 36 is tapered as indicated at 92. The inner end of the fingers 36 are provided with a pair of circumferential ribs 94 which, when the fingers are inserted in openings in the shafts 32, are positioned one on either side of the wall of the tubing forming the shafts. The stripping fingers 36 are arranged so that oppositely extending fingers are positioned coaxial, and immediately below such pair of fingers another pair of fingers is disposed transversely thereto, resulting in a staggered relationship of successive fingers angularly round the shafts. The vertical spacing of the fingers is approximately the same as the thickness of individual fingers, as indicated in Figures 2 and 4.

The tapered portions 92 of the fingers are generally flat, while the main body of the fingers may be round or other shape. The fingers are disposed with the flat portions thereof in the plane of movement of the respective fingers incident upon the rotation of the shafts.

Figure 11 shows a modified form of stripping finger. Instead of separate fingers 36 extending from the opposite sides of the shaft, a double finger element 96 may extend completely through the shaft and form two oppositely directed single fingers. The finger of Figure 11 shows ribs 94 positioned the full length of the finger portions, except in the middle section thereof. The ribs 94 adjacent the straight middle portion of the finger element serve to center the finger in the shaft 32 and retain it in place therein. The finger 96 is also tapered at its outer end similarly to the stripping fingers 36 of Figures 8, 9 and 10.

It will be noted that the ribs 94 are formed substantially the full length of the stripping finger of Figure 11. However the main portions of the fingers 96 may be without ribs similarly to fingers 36, if desired. Also, if desired the stripping fingers 36 may be provided their full length with ribs 94. The ribs 94 serve to provide additional strength in the fingers and yet permit a certain degree of flexibility.

Both forms of stripping fingers 36 and 96 show the flat portions of the tapers 92 to be smooth. Ribs 94 may be formed across these surfaces also if desired.

In operation, the operator inserts the stems of flowers in a bunch in the opening 82 in the top thereof behind the rotating fingers 36, holding the bunch by the top, and drawing the stems through the fingers which rotate in opposite directions as indicated by the arrows in Figure 3.

The speed of rotation is considerable, and in drawing the stems through the fingers, successive fingers enter between the stems in the bunch and effectively strip all of the leaves and thorns from the stems.

The shafts 32 are inclined rearwardly so that they are disposed substantially normal to the hands of the operator when he is standing in front of the machine.

The axial offset relation of angularly successive fingers insures a greater degree of contact of the fingers with the stems, with consequent high efficiency.

The high speed at which the stripping fingers 36 rotate produces considerable physical contact with the leaves and thorns, and the force thereof throws them rearwardly therefrom. The speed of rotation of the fingers 36 also creates an air stream, and the physical contact of the fingers with the leaves and thorns together with such air stream carries them rearwardly through the upper section 18 of the cabinet down through the vertical passage 80 in the lower section 16. A receptacle may be placed under the passage 80 to catch the leaves and thorns.

It has been found that the present device is extremely convenient and effective. The construction of the fingers 36 and 96 is such that the skin on the stems is not injured in any way. Due to the flexibility and the tapered portions of the stripping fingers, such fragile flowers as lilies can be stripped without injury to the stems.

As explained above, the bearing sockets 26 are adjustable transversely of the machine for adjusting the shafts 32 and bringing the fingers on the shafts closer together or farther apart. If desired the shafts 32 may be adjusted so close that the tapers on the stripping fingers on opposite shafts intermesh.

The respective shafts 32 may be angularly fixed so that the fingers on both shafts merge and mesh when they meet, or they may be angularly offset as shown in Figure 3, if desired, so that they will not mesh.

While I have herein shown and described a preferred embodiment of my invention, manifestly it is susceptible of modification and rearrangement of the parts without departing from the spirit and scope thereof. I do not, therefore, wish to be understood as limiting my invention to the precise form herein disclosed, except as I may be so limited by the appended claims.

I claim:

1. In a machine of the kind described, a frame, a pair of radially spaced shafts rotatably mounted on the frame, each of said shafts having a plurality of angularly spaced radial fingers, each of said fingers being of generally elongated formation and having its outer portion generally flattened and tapered toward its outer end, said flattened portion having its flat sides lying in the plane of movement of the finger incident to rotation of its shaft, angularly adjacent ones of said fingers being in axially offset planes, and means for rotating said shafts.

2. In a machine of the kind described, a frame, a pair of radially spaced shafts rotatably mounted on the frame, each of said shafts having a plurality of series of axially spaced, diametrically extending holes formed therein, said series being angularly positioned with respect to each other, each hole being axially offset with respect to adjacent holes in the other series, a finger element in each hole, each finger element extending radially outwardly from opposite sides of the shaft to form two fingers, and means for rotating said shafts.

3. In a machine of the kind described, a frame, a pair of radially spaced shafts rotatably mounted on the frame, each of said shafts having a plurality of series of axially spaced, diametrically extending holes formed therein, said series being angularly positioned with respect to each other, each hole being axially offset with respect to adjacent holes in the other series, a finger element in each hole, each finger element extending radially outwardly from opposite sides of the shaft to form two fingers, each of said fingers being of generally elongated formation and having its outer portion generally flattened and tapered toward its outer end, said flattened portion having its flat sides lying in the plane of movement of the finger incident to rotation of its shaft, and means for rotating said shafts.

4. In a machine of the kind described, a frame, a pair of radially spaced rotatable shafts mounted in the frame, each of said shafts having a plurality of radially extending flexible fingers, each of said fingers being elongated and having its outer portion tapered and flattened, the flat sides of said tapered portions lying in the plane of movement of the fingers incident to rotation of its shaft, and means for rotating said shafts.

5. In a machine of the kind described, a generally enclosed cabinet, a pair of vertically disposed, radially spaced shafts rotatably mounted in the cabinet adjacent one end thereof, said shafts each having a plurality of radial fingers, said cabinet having an opening therein disposed between said shafts, said opening being disposed in the side wall and extending the height of said shafts, and longitudinally in the top of the cabinet to the length of said fingers, said cabinet having a second opening at the bottom of the end thereof opposite the first opening, the top of the cabinet being generally curved downwardly from the first opening to the second opening, and means for rotating said shafts.

6. In a machine of the kind described, a generally enclosed cabinet, a pair of generally vertically disposed, radially spaced shafts rotatably mounted in the cabinet adjacent one end thereof, said shafts being inclined upwardly away from their adjacent end of the cabinet, said shafts each having a plurality of radial fingers, said cabinet having an opening therein disposed between said shafts, said opening being disposed in the side wall and extending the height of said shafts, and longitudinally in the top of the cabinet to the length of said fingers, said cabinet having a second opening at the bottom of the end thereof opposite the first opening, the top of the cabinet being generally curved downwardly from the first opening to the second opening, and means for rotating said shafts.

7. In a machine of the kind described, a frame, a pair of oppositely rotating radially spaced shafts rotatably mounted on the frame, each of said shafts having a plurality of radial fingers, each of said fingers having a relatively large main body portion and an outer end portion tapered with respect to the body portion, said fingers having relatively great length with respect to the diameter of the shafts, said shafts being spaced apart so that the tapered outer ends of the fingers on the respective shafts are positioned adjacent each other during rotation thereof, and means for rotating said shafts.

8. In a machine of the kind described, a frame, a pair of oppositely rotating radially spaced shafts rotatably mounted on the frame, each of said shafts having a plurality of radial fingers, each of said fingers having a relatively large body portion and an outer end portion tapered and flattened with respect to the body portion, said flattened portion having its flat sides lying in the plane of movement of the finger incident to rotation of its shaft, and means for rotating said shafts.

9. In a machine of the kind described, a frame, a pair of radially spaced rotatable members mounted on the frame, each of said rotatable members having a plurality of series of axially spaced holes formed therein, said series being angularly positioned with respect to each other, each hole in each series being axially offset with respect to adjacent holes in the other series, a finger element in a plurality of said holes, each finger element extending radially outward from said member, and means for rotating said members.

10. In a machine of the kind described, a frame, a pair of radially spaced rotatable members rotatably mounted on the frame, each of said rotatable members having a plurality of axially spaced holes formed therein, each hole in each of said rotatable members being angularly positioned with respect to adjacent holes, the holes in one of said rotatable members being axially offset with respect to the holes in the other rotatable member, a finger element in a plurality of said holes, each finger element extending radially outward from the associate rotatable member, and means for rotating said rotatable members.

11. In a machine of the kind described, a frame, a pair of radially spaced rotatable members rotatably mounted on the frame, each of said rotatable members having a plurality of axially spaced holes formed therein, each hole in each of said rotatable members being angularly positioned with respect to adjacent holes, the holes in one of said rotatable members being axially offset with respect to the holes in the other rotatable member, a finger element in a plurality of said holes, each finger element extending radially outward from the associate rotatable member, each of said fingers having a relatively large main body portion and an outer end portion tapered with respect to the body portion, said rotatable members being spaced apart so that the tapered outer end portions of the fingers on the respective rotatable members are positioned adjacent each other during rotation thereof, and means for rotating said rotatable members.

OSCAR W. SWANSON.

REFERENCES CITED

The following references are of record in the file of this patent:

UNITED STATES PATENTS

| Number | Name | Date |
|---|---|---|
| Re. 22,323 | McMahan | May 25, 1943 |
| 467,477 | Buchanan | Jan. 19, 1892 |
| 476,234 | Myers | May 31, 1892 |
| 887,519 | Reed | May 12, 1908 |
| 1,372,595 | Bouda | Mar. 22, 1921 |
| 2,196,849 | Beeg | Apr. 9, 1940 |
| 2,226,206 | McConnel | Dec. 24, 1940 |

FOREIGN PATENTS

| Number | Country | Date |
|---|---|---|
| 116,500 | Australia | Jan. 27, 1943 |